May 6, 1941.　　　J. GEISSLINGER　　　2,240,927
ELECTRIC BALANCE FOR CLOCKS, WATCHES, AND THE LIKE
Filed May 27, 1938　　　2 Sheets-Sheet 1

INVENTOR:
JOHN GEISSLINGER,
BY Julian J. Wittel
his ATTORNEY.

May 6, 1941. J. GEISSLINGER 2,240,927
ELECTRIC BALANCE FOR CLOCKS, WATCHES, AND THE LIKE
Filed May 27, 1938 2 Sheets—Sheet 2

JOHN GEISSLINGER,
INVENTOR,
BY Julian J. Wittel,
his ATTORNEY.

Patented May 6, 1941

2,240,927

UNITED STATES PATENT OFFICE 2,240,927

ELECTRIC BALANCE FOR CLOCKS, WATCHES, AND THE LIKE

John Geisslinger, Jamaica, N. Y.

Application May 27, 1938, Serial No. 210,295

3 Claims. (Cl. 58—28)

This invention relates to electrically operated time pieces, and has for its main object to provide a novel, electrical drive for the same, operated through a new escapement mechanism.

Another object of this invention is to provide an electrical oscillator or balance for such time pieces which will require a very small amount of electrical energy.

It is well known that the synchronous clock movements will keep more accurate time than any spring wound. However, they keep time only when the electric current received from the power station is absolutely synchronized, and should there be any interruption in the power, even for a fraction of a second, the self-starting movements will resume operation as soon as the current is on, and, of course, the time of stopping will be lost.

Unlike the synchronous movements, which will operate on a specific cycle and voltage of current only (i. e. 110 volt—60 cycle, or 110 volt—25 cycle) are the independent or the periodically wound clock movements which have, besides their regular clock mechanism, an electric magnet, an armature and contact for the electric winding mechanism, all of which are very complicated and noisy in operation, and which will only operate properly as long as the current is sufficient to drive the winding apparatus. In many cases, the electric contacts, which operate the winding mechanism, may burn out and for all these reasons, such types of clocks have not reached any popularity.

In my present invention, I provide a clock mechanism which will overcome these drawbacks in the electric clock field, not only through its simplicity of construction and elimination of all the parts which are necessary in the periodically wound clocks, but through its efficiency in the use of very small power through my new balance wheel, which will operate on both (direct or alternating) currents. Furthermore, said balance wheel will drive my new, so to say "fool-proof," escapement which then will drive the hand mechanism. This clock movement is especially constructed for the use in automobiles, aeroplanes, small boats and ships, as well as in trains where no synchronized current is available or where the noisy periodically wound clocks are not desired.

In the drawings, forming a part of this specification, and accompanying the same:

Figure 1:
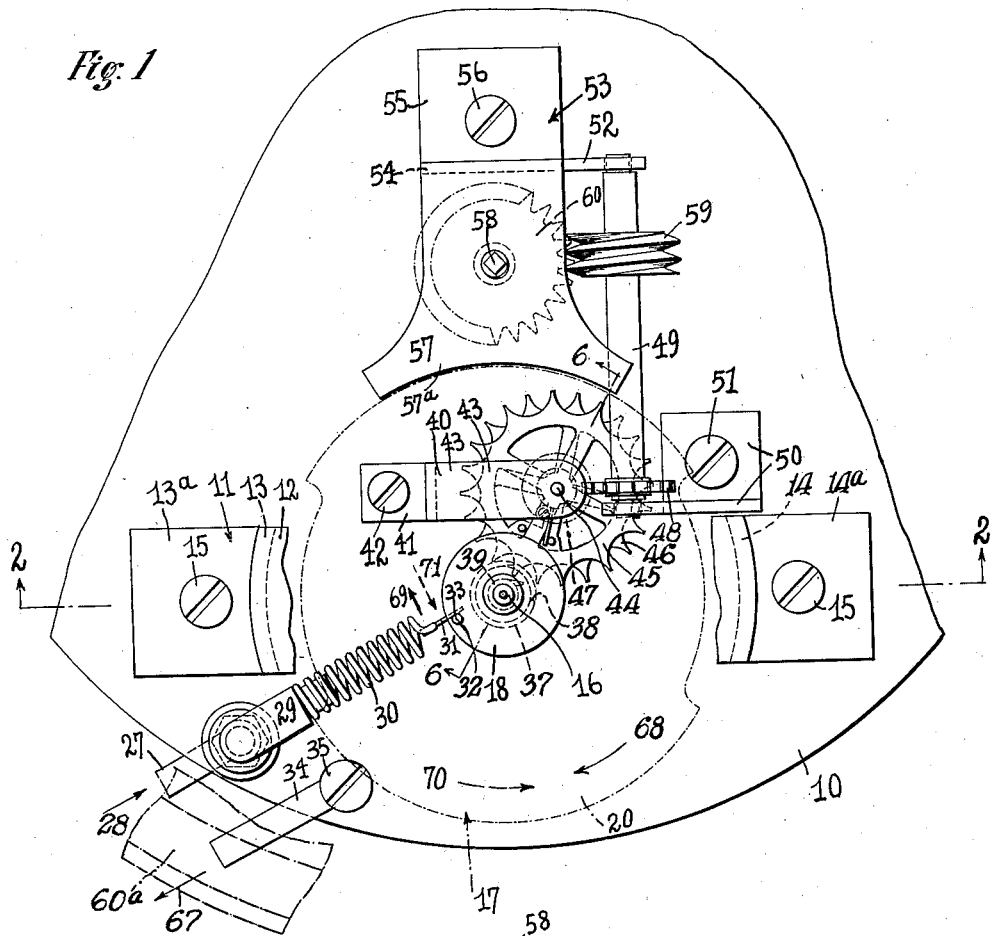
Fig. 1 is a fragmentary plan view of my device, portions of the same having been removed.

Referring now to the drawings, more in detail, by characters of reference, the numeral 10 indicates a base plate for my electric clock movement, being of any appropriate material, in this embodiment electro-conductive metal.

An elevated bridge plate, generally indicated by the numeral 11, is secured on the base plate 10, said bridge plate 11 having a transverse upper member or a bridge proper 12, two upstanding side portions 13 and 14, and two outwardly turned flanges 13a and 14a, respectively, through which the bridge 11 is secured on the base plate 10, as by the screws 15.

Figure 2:
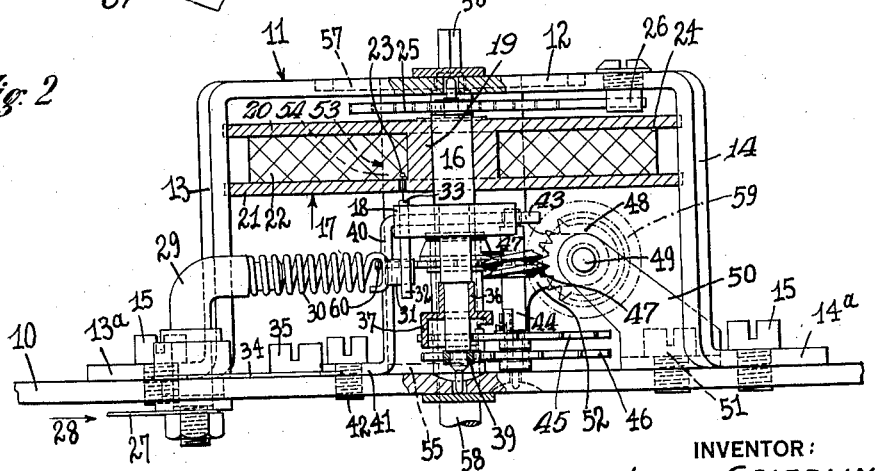
Fig. 2 is an elevational view of the same, partly in section, the section being taken on the line 2—2 of Fig. 1, and through certain portions of the device only.

A balance or main shaft 16 is journalled in the base plate 10 and in the bridge member proper 12, respectively, as shown in Fig. 2, and on said shaft is secured an electric balance element or oscillator, generally indicated by the numeral 17, being shown in Fig. 2 in section, and in an imaginary manner by dot and dash lines in the plan view of Fig. 1, since it is to be understood that in the showing of Fig. 1, the middle portion of the bridge element proper 12 has been broken away, and all the members on the shaft 16, above a certain insulating disk 18, to be explained hereinafter, have been removed.

The electric oscillator 17 is composed of a sleeve 19 of iron adapted to be magnetized under the influence of electric current, and being of electro-conductive properties, said sleeve having an upper flange 20 and a lower flange 21 of identical shape, as indicated by the dot and dash outline in Fig. 1. The major portion of the space between the two flanges 20 and 21 is filled by a coil 22 of electro-conductive insulated wires wound in closely set fine windings around the sleeve 19, and having a starting end 23 and a terminating end 24, said coil being insulated from the sleeve and flanges, as it is well known.

A usual coiled hair-spring 25 is arranged on the shaft 16 above the electric oscillator 17, one end thereof being secured to said shaft, while the other end is secured to a stationary part of the mechanism, like the bridge plate 12, as indicated at 26.

The electric current, coming from any appropriate source, as will be explained hereinafter, is introduced into my device through a receiving pole plate 27, as indicated by the arrow 28, and then carried through the bent screw 29, insulated from the base plate 10 and the rest of the mechanism, and from the screw 29 it is led into the coiled spring 30 ending in a free swinging contact metal plate 31.

Underneath the electric balance or oscillator member 17, is arranged on the shaft 16 the mentioned insulating disk 18 into which is secured an electro-conductive contact metal pin 32, normally being in contact with the said plate 31, while its upper end 33 is electro-conductively but insulatedly connected to the starting end 23 of the coil 22.

The terminating end 24 of the electric coil is electro-conductively secured, as by soldering, to the upper flange 20, through which the electricity will be led into the hair-spring, bridge 11 and plate 10 and finally will be returned through a second connector plate 34 secured to the base plate 10, as by the screw 35.

Figure 3:
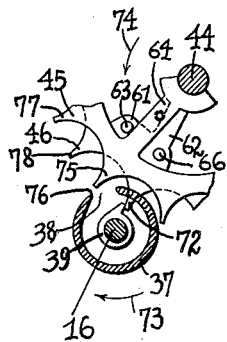
Figs. 3, 4 and 5 are diagrammatic, fragmentary plan views, partly in section, indicating the various phases of certain oscillating members in my device.
Figure 4:
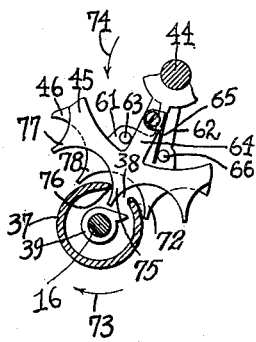
Figure 5:
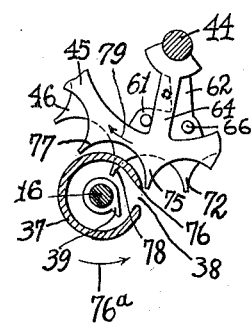

Still further down on the shaft 16, below the insulating disk 18, a metal sleeve 36 is secured, ending in a downwardly open hollow cylinder 37 of larger diameter than said sleeve. A small portion 38 of the hollow cylinder 37 is removed, as best shown in the diagrams of Figs. 3 to 5.

Near the lower end of the shaft 16, below said cylinder 37, a cam device 39 is secured thereon. A Z shaped bracket 40 is secured to the rear of the shaft 16 on the base plate 10, as by its outwardly turned flange 41 and screw 42, having a transverse upper flange 43.

An escapement shaft 44 is journalled in the base plate 10 and in said upper flange 43 (Fig. 2). On the lower portion of the shaft 44 is secured the escapement wheel 45, while near the lower end of said shaft below the escapement wheel 45, a similar second wheel 46 is arranged loosely on the shaft 44.

On the upper portion of the shaft 44 is secured a worm 47, meshing with the worm wheel 48 on a rearwardly extending shaft 49, journalled in a front bracket 50, secured by the screw 51 to the base plate 10, and in a rear bracket arm 52, said arm 52 being part of the larger rear generally Z shaped bracket 53, having an upstanding portion 54, a rearwardly extending base flange 55, by which it is secured on the base plate 10 through the screw 56, and a peculiarly shaped forwardly extending upper flange 57, generally in line with the upper bridge member proper 12, its front end 57a serving for the regulator graduations, as usual. The arm 52 in which the rear end of the horizontal shaft 49 is journalled is an extension of the upstanding portion 54 of the rear bracket 53. A vertical shaft 58 is journalled in the upper flange 57 of the bracket 53, and in the base plate 10, being extended downwardly through the base plate 10, said shaft to carry the hands of the clock (not shown).

A worm 59 is secured on the shaft 49, meshing with a worm wheel 60 on the shaft 58, so that the shaft 58 is driven by shaft 49, and ultimately through the movement of the escapement wheel.

Figure 6:
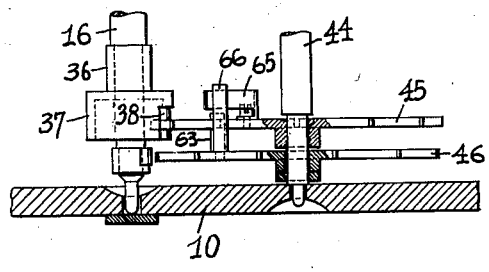
Fig. 6 is a fragmentary elevational view, partly in section, of an oscillating hollow cylinder, a cam and two toothed wheels, the partial sections being taken on the line 6—6 of Fig. 1.

On an extension 61 of a spoke 62 (Fig. 4) of the lower wheel 46 (Figs. 4 and 6), a shorter upstanding pin 63 is secured, normally being in contact with an adjacent spoke 64 of the upper wheel 45, while a flat spring 65, secured on said spoke 64, may be engaged by a longer pin 66 on the spoke 62 of the lower wheel 46, being on the other side of said upper spoke 64.

The operation of my device, is as follows:

The electric circuit being closed, the current will enter through the plate terminal 27, as indicated by the arrow 28, will pass through the spring 30 and pin 32, into the windings 22 of the oscillator balance 17, as at 23, and will leave the same at 24, entering into the metallic body of the device, as described hereinbefore, and will leave through the plate terminal 34, as indicated by the arrow 67. The balance oscillator 17 will now become electro-magnetic, as it is well known to those versed in this art, and will be attracted by the bridge 11 formed of magnetizable metal, like soft iron.

Suppose the balance oscillator will be rocked in the direction of arrow 68 (Fig. 1); its rocking will continue until the pin 32 will ride to the end of plate 31, at the termination of the conductor spring 30, said spring swinging in the direction indicated by the arrow 69, after which the pin 32 will be freed from the plate 31 and spring 30, passing to the opposite side of the terminating plate 31, whereupon the magnetic attraction of the balance 17 will cease.

During the rocking in the direction of the arrow 68 of the balance 17, the hair-spring 25 will be tensioned, as will be obvious. After the contact pin 32 is freed from the terminal plate 31, the balance 17 may for a short time continue its rocking in the direction of the arrow 68, through the inertia of the rocked masses, whereupon the hair-spring 25 will return the same, as indicated by the dotted arrow 70. The inertia of the masses in the return direction, as well as the stored-up energy of the spring 25, will carry the pin to and over the plate 31, as indicated by the dotted arrow 71, and upon the swinging back of the balance 17, again in the direction of arrow 68, through the reverse energy of the hair-spring 25, the pin 32 will again contact the plate 31, when the action described hereinbefore will be repeated.

In this manner, the balance 17 will describe left-hand and right-hand oscillations, as indicated by the arrows 68 and 70, as long as the electric circuit is closed, and this permanent oscillation is used to drive the escapement wheel, in one direction and at a permanent rate of speed, as it is well known in the time measuring art. The balance oscillator 17 is secured on the shaft 16, as has been described hereinbefore, and said shaft obviously will describe the same oscillations as the balance 17, carrying with it, and causing to oscillate, the hollow cylinder 37 and the cam 39, near the bottom end thereof.

The escapement wheel proper is the wheel 45 which is fast on the escapement shaft 44, and underneath the escapement wheel 45 is secured an auxiliary advancing wheel 46 being loose on the shaft 44.

The co-operation of these parts may be best understood if we begin to study their interplay, in the position shown in Fig. 3.

In this position, cam 39 is engaging a tooth 72 of the lower, auxiliary or advancing, wheel 46, and this position may be imagined as the starting of the oscillation of the balance 17 in the direction of the arrow 68, the hollow cylinder 37 starting to oscillate in the direction of the arrow 73. Cam 39 will push the tooth 72 in an anti-clockwise direction and with it the wheel 46, as indicated by the arrow 74, whereby pin 63 will carry the upper balance wheel 45 in the same direction, as will be understood, and so the tooth 75 on the escapement wheel 45 will also advance in the direction of the arrow 74 and will be placed into the slot or space 38, as indicated in Fig. 4, and will be engaged by the forward operating edge 76 of the cylinder 37 for said slot 38. Tooth 75, and with it escapement wheel 45, will be pushed by said edge 76 in the direction of the arrow 74 until it reaches the position shown in Fig. 5, and obviously, the shaft 44 will be turned in the direction of arrow 74 with an angle corresponding to the forward travel of the tooth 75. The position indicated in Fig. 5 may be considered as the final forward one, corresponding to the rocking of the balance 17 in the direction of arrow 68, and said balance now starts in its reverse oscillation, as indicated by the arrow 70 (Fig. 1). The movement of the parts will now obviously be reversed and the hollow cylinder 37, as well as the cam 39 will start to oscillate in the reverse direction, as indicated by the arrow 76a.

During this rearward oscillation, the escapement wheel 45 is prevented from any movement, there being no tendency for the same, but, just the reverse, a resistance in the parts, and also said wheel being locked in its position through the hollow cylinder 37, snugly but slidably rocking between the two adjacent teeth 75 and 77 of said wheel 45 and preventing the movement of the same in either direction. The cam 39, however, will act on the next rearward tooth 78 of the auxiliary advance wheel 46 in a backward direction, and will push the same rearwardly, as indicated by the arrow 79, until the same is passed by said cam, while, at the same time, the pin 66 will bend the flat spring 65 rearwardly to permit such a rearward rocking (in the direction of arrow 79) of the wheel 46 and its associated parts without influencing the wheel 45. This reverse oscillation of the hollow cylinder 37 and the cam 39 will now continue and end in about the position shown in Fig. 3, when the next forward oscillation of the balance 17 (arrow 68) will again start, and the hollow cylinder 37 and the cam 39 will again rock in the direction of arrow 73, as indicated in Fig. 3, propelling both wheels with another tooth, the tooth now engaged by the cam 39 being the one indicated by 78 in the wheel 46, and the tooth pushed forwardly by the hollow cylinder 37 being the one indicated at 77 for the escapement wheel 45. It is to be understood, namely, that the spring 65 will return the tooth 78 to the front of the cam 39 for the new operation starting with the position as indicated in Fig. 3.

It will be obvious that, in this manner, every back and forth oscillation of the balance 17 will advance the escapement wheel 45 with one tooth, this being exactly the desired result in a time measuring instrument.

The rest of the device is not new and is not claimed as my invention, it simply has been shown in Figs. 1 and 2 as one of the possible usual devices to transmit the timed permanent rotation of the escapement wheel to the hands of a time measuring instrument.

For the sake of fullness, however, I may remark that the rotation of the escapement shaft 44 is transmitted to a worm wheel 48, through the worm 47, said wheel being fast on the shaft 49, the rotation of which again being transmitted through the worm 59 and the worm gear 60, to the shaft 58, this being the shaft on which is secured one of the hands of the time piece from which the other hand may be driven with the necessary reduction by any of the means well known in this art. The whole mechanism of my device may be housed in a casing 60a, not shown but indicated in a fragmentary and imaginary manner in Fig. 1.

Figure 7:
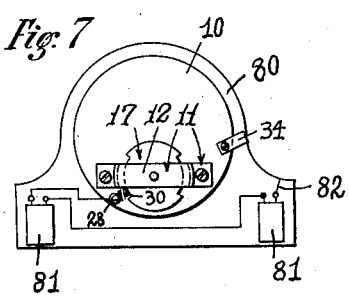
Fig. 7 is a diagram showing a clock casing with my self-contained electric clock therein.

In Fig. 7, I show, in a diagrammatic view, a clock into which my novel electric drive has been installed, and which may carry its own source of current so that the same is a self-contained automatic unit in the casing 80.

As will be seen, the base plate 10 of my device is arranged in said casing, having arranged thereon, the bridge piece 11 and the balance 17, as well as the other parts, described hereinbefore (not shown). The electric current may be provided through two dry batteries 81, connected in series as shown, entering the device from one battery as at 28, leaving the same as at 34, closing through the body of the casing into the other dry battery, as indicated at 32.

It will be seen that my invention makes it possible to provide an electrically operated time piece with its source of current in one single unit in a casing, making the same portable and adapted to be used even for watches, since my device may be operated on two very small dry batteries giving an electric tension of two to three volts only.

What I claim as new is:

1. In an electric time piece, an oscillatable balance, comprising a shaft, a hairspring between said shaft and a stationary element, to cause said shaft to oscillate, a sleeve of magnetizable material secured on said shaft, two spaced apart identical flanges on said sleeve, a coil of insulated electro-conductive wires wound around said sleeve in the space between the two flanges, two oppositely placed members of quickly magnetized material stationarily secured adjacent to said flanges, and perpendicularly thereto, each being narrower than the diameter of said flanges, a marginal portion of said flanges opposite each perpendicular member being removed, said flanges being adapted to rock in the space between said members, means to pass an electric current through said coil, and means to intermittently break said current, said last mentioned means being controlled by the oscillation of the balance.

2. In an electric oscillating balance, as set forth in claim 1, and a bridge piece of magnetizable material over the said flanges connecting said perpendicular members.

3. In an electric oscillating balance, as set forth in claim 1, said means for passing a current through said coil and intermittently breaking it, comprising, an insulating disk on said shaft, an electro-conductive pin secured into said disk, an electro-conductive spring leaf connected to one source of the current, normally in contact with said pin, one end of said coil being connected to said pin, said pin being adapted to wipe along said leaf, to leave the same, and to again contact, wipe, and leave the same, from the other side, upon the oscillation of said shaft.

JOHN GEISSLINGER.